United States Patent [19]

Calle

[11] 4,182,135
[45] Jan. 8, 1980

[54] INSTALLATION FOR DISTRIBUTING REFRIGERATED AIR IN CONTAINERS

[75] Inventor: Daniel G. Calle, Montivilliers, France

[73] Assignee: Compagnie General d'Entretien et de Reparation - Coger, France

[21] Appl. No.: 897,762

[22] Filed: Apr. 17, 1978

[30] Foreign Application Priority Data

May 5, 1977 [FR] France .................. 77 13714

[51] Int. Cl.² ............................................. F25D 17/06
[52] U.S. Cl. ......................................... 62/419; 62/240
[58] Field of Search .......................... 62/240, 419, 89; 114/72

[56] References Cited

U.S. PATENT DOCUMENTS

| | | | |
|---|---|---|---|
| 3,440,834 | 4/1969 | Hirai et al. ........................... | 62/240 |
| 3,879,957 | 4/1975 | Wilson et al. ......................... | 62/240 |
| 4,012,922 | 3/1977 | Falensky ............................... | 62/240 |

Primary Examiner—Ronald C. Capossela
Attorney, Agent, or Firm—Gifford, Chandler, VanOphem, Sheridan & Sprinkle

[57] ABSTRACT

The invention relates to an installation for distributing refrigerated air, wherein an air distributing shaft is provided with a series of pairs of air insufflation orifices and air recovery orifices, two orifices of each pair being connected to a container. A refrigerator-centrifugal fan unit is mounted on the shaft between an air inlet passage and an air outlet passage. On each side of the inlet passage and of the outlet passage, the shaft comprises channels arranged in spike-fashion, which present a sharp reduction in section at the level of each of the air insufflation or recovery orifices. These reductions in section are determined in order to have the same static pressure of insufflation or recovery at the level of the different air insufflation or recovery orifices. The invention is more particularly applied to ships carrying refrigerated containers.

7 Claims, 4 Drawing Figures

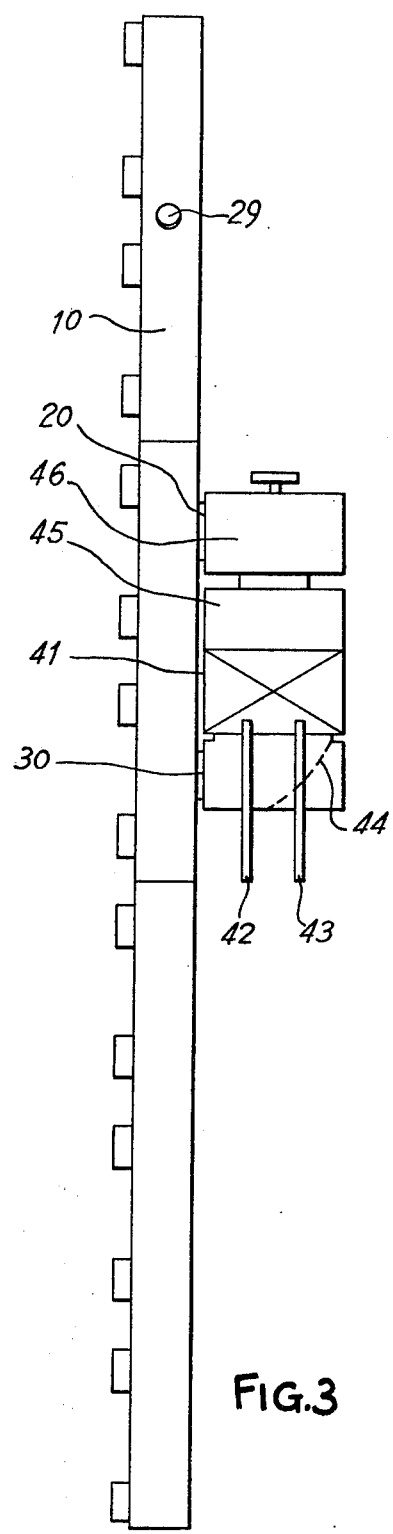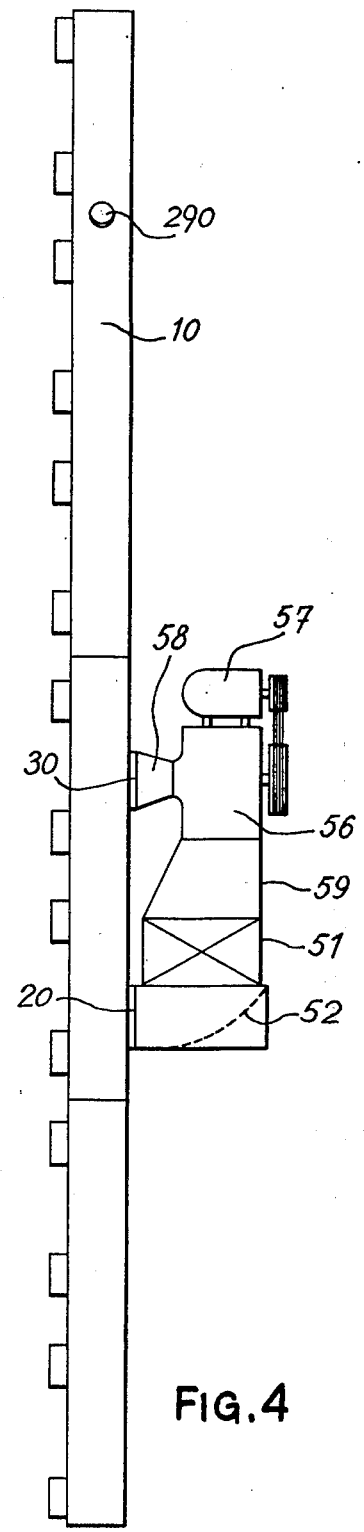

INSTALLATION FOR DISTRIBUTING REFRIGERATED AIR IN CONTAINERS

BACKGROUND OF THE INVENTION

1. Field of the Invention

The present invention relates to the transporting of refrigerated containers in ships' hulls.

SUMMARY OF THE PRESENT INVENTION

This type of transport, which is tending to generalize uses isothermic containers, each provided with two orifices. One of these orifices is intended for the insufflation of refrigerated air into the container, and the other for recovering said air. In a ship's hull, the containers are stacked in parallel piles which may contain from three to nine containers.

The distribution of refrigerated air is effected with the aid of a vertical structure, called "shaft", associated with each pile of containers. The structure comprises a first pipe adapted for the admission of refrigerated air in the containers, and a second pipe adapted for the return of the air after it has been recovered from the containers. It also comprises a box-like installation for the circulation of refrigerated air between the admission pipe and the return pipe. The installation comprises an air cooling battery associated with a fan which ensures the forced circulation of air in the admission and return pipes of the shaft, and through the containers. The air cooling battery may function from a conventional frigorific fluid. On board ship, this battery is most often supplied with a cold brine produced in the central installations of the ship.

The freight loaded on board in the refrigerated containers is fairly diverse. The most demanding cargos are foodstuffs, particularly fruit which is particularly delicate to conserve, such as bananas and strawberries.

Such cargos are firstly very sensitve to the humidity in the air which is brought to them. It is then desirable that the cooling installation be able to ensure a constant cooling independently of the fact that the container is connected in the central part of the shaft, which is near the installation generating refrigerated air, or at the ends of the shaft. Furthermore, it is necessary that the power absorbed by the refrigerated air producing and distributing installation be as low as possible, and that this installation takes up the minimum of space in the ship's hold.

Under these conditions, it is a first object of the invention to provide an installation for distributing refrigerated air in which the flow of the air remains laminary in virtually any condition, and especially in which the supply pressure is the same for all the orifices for the insufflation of refrigerated air in the containers, and for all the orifices recovering the air returning from the containers.

It is a second object of the invention to allow a renewal of the air distributed in the containers without this renewal substantially disturbing the regularity of the distribution of air.

It is a third object of the invention to provide a device generating refrigerated air which allows a supply of air under a high total pressure, without being the source of a condensation of the humidity which must be contained in the air for foodstuffs, and which presents, moreover, small dimensions.

The proposed installation for distributing refrigerated air is of the type comprising a vertical structure provided with a series of pairs of orifices for the insufflation of refrigerated air into the containers and for recovering air from the same containers, with an admission channel connected to the air insufflation orifices, a return channel connected to the air recovery orifices, an air inlet passage in the admission channel and an air outlet passage from the return channel. With this vertical structure is associated a device for circulating refrigerated air, comprising an air cooling battery and a fan.

According to an essential feature of the invention, starting from the air inlet passage, the admission channel presents a portion in spiked form where it successively supplies different air insufflation orifices, presenting a sharp reduction in section at the level of each of these orifices.

Similarly, starting from the air outlet passage, the return channel presents a portion in spiked form where it is connected successively to different air-recovery orifices, presenting a sharp reduction in section at the level of each of these orifices.

These reductions in section are determined in order to have the same static pressure of insufflation at the level of the different insufflation orifices, and the same static pressure of recovery at the level of the different air recovery orifices. Of course, the insufflation and recovery pressures are different.

The admission channel and the return channel advantageously each present two portions in spiked form, on either side of the air inlet passage and the air outlet passage respectively.

To allow a renewal of the air applied to the containers, the air admission channel presents an auxiliary orifice for evacuating part of the refrigerated air, and the air return channel presents an auxiliary orifice for the admission of fresh air. These two orifices are advantageously located in the zones of said channels which supply their last container orifice.

According to another important feature of the invention, the fan is a centrifugal fan with rearwardly inclined blades. Such a fan furnishes a high total pressure which improves the operational conditions of the air admission channel and of the air return channel. Moreover, the rearwardly inclined blades are not subjected to a condensation of the humidity contained in the air.

In one embodiment, the fan is disposed between the air cooling battery and the air inlet passage. A space is then arranged between the suction inlet of the fan and the outlet of the cooling battery. This embodiment allows the best energetic yield from the aeraulic point of view, but it exceeds hygrometric degrees equal to 85% only with difficulty.

In another embodiment, the fan is disposed between the air outlet passage and the cooling battery. A horn of convergent demi-angle close to 15° is mounted between the outlet passage and the suction inlet of the fan, and a divergent of demi-angle of about 6° to 7° is mounted between the outlet of the fan and the cooling battery. This embodiment adapts itself to hygrometric degrees up to about 95%.

BRIEF DESCRIPTION OF THE DRAWING

The invention will be more readily understood on reading the following description with reference to the accompanying drawing, in which:

FIG. 3 is a side view of the first embodiment of the invention, showing the vertical structure of the air distributing installation with the box comprising the air cooling battery and the fan disposed downstream of said battery; and FIG. 4 is a side view of the installation according to the invention in a second embodiment where the fan is disposed upstream of the air cooling battery.

DETAILED DESCRIPTION OF THE PRESENT INVENTION

Figure 1:
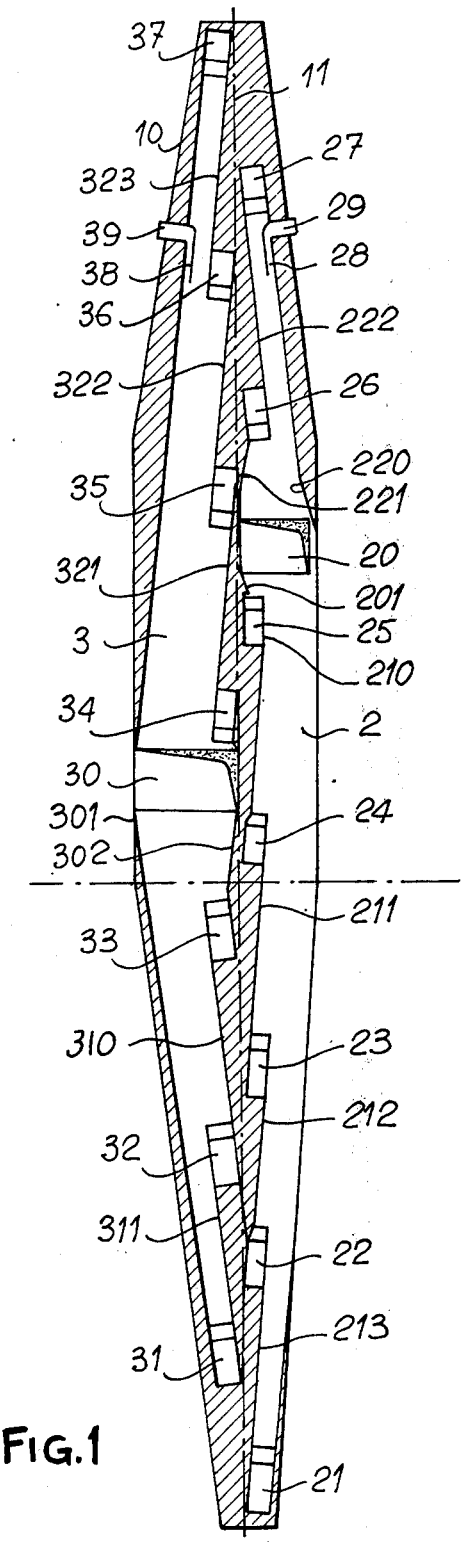
FIG. 1 illustrates a sectional view of the vertical structure comprising the air admission channels and air return channels, the series of air-insufflation and air-recovery orifices which must be connected to the containers, as well as the air inlet passage and the air outlet passage which are connected to the box-like installation for circulating the refrigerated air.
Figure 2:
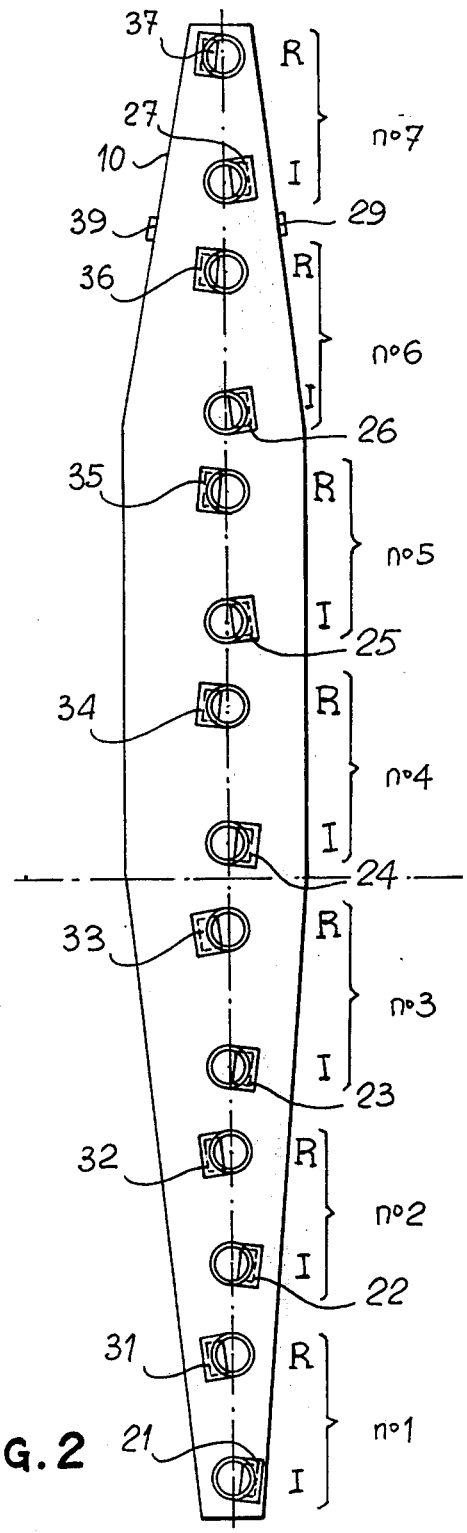
FIG. 2 is an outside front view of the structure of FIG. 1, showing the orifices coupling this structure to seven different containers.

Referring now to the drawings, FIGS. 1 and 2 will firstly be described, which show the vertical structure essentially comprising the air admission channel and the air return channel, as well as the pairs of air insufflation and recovery orifices; FIGS. 3 and 4 will then be described which show the two embodiments of the box-like installation for circulating refrigerated air, comprising the fan and the cooling battery.

The vertical structure, which will now be referred to as shaft, has for its function to distribute the refrigerated air to each series of pairs of air insufflation and recovery orifices for one container. The shaft of FIGS. 1 to 4 is intended to supply seven containers measuring 40 feet (about 12 meters long) and it is itself about 18 meters in height. The installation for distributing refrigerated air, and in particular the shaft, comprises an insulation of the same quality as that of the containers, for example to obtain a coefficient of insulation K equal to 0.35 kilocalories per hour, per square meter and per degree Celsius.

The whole of the shaft is surrounded by a bearing structure (not shown) inside which the shaft itself is delimited by an outer wall 10. In the section of FIG. 1, as in the outside view of FIG. 2, the outer wall 10 is generally defined as the association of two elongated trapeziums connected by a substantially rectangular intermediate portion. Inside this wall 10, the shaft contains two completely separate portions separated by a median wall 11. The right-hand part 2 of the shaft defines the air admission channel. The left-hand part 3 of the shaft defines the air return channel. As the admission pressure of the air is higher than the return pressure thereof, the cross-sections of the admission channel 2 are smaller than the cross sections of the return channel 3, so that the two channels may admit the same flow of air. In FIG. 1, the zones situated inside the wall 10 of the shaft which do not form part of the air admission channel or the return channel are hachured to enable the drawing to be more readily understood.

From the bottom, the air insufflation channel 2 is connected to orifices for the insufflation of air into the containers, numbered from 21 to 27 respectively. Similarly, from the bottom, the air return channel 3 is connected to air recovery orifices, numbered from 31 to 37, connected to the outlets of the containers.

Furthermore, to allow the renewal of the air, the shaft advantageously comprises an auxiliary orifice 29 intended for evacuating part of the refrigerated air from the air admission channel 2. Similarly, the air return channel 3 comprises an orifice 39 for the admission of fresh air. In fact, the pressure in the return pipe 3 being relatively low, the orifice 39 and the channel 38 associated therewith will allow fresh air to be admitted. Inversely, the pressure in the admission channel 2 is higher, and this is why the orifice 29 and the channel 28 associated therewith will allow the expulsion of part of the refrigerated air. The opening of orifices 29 and 39 is advantageously controlled either manually or automatically.

According to the invention, the admission channel 2 comprises, from the air inlet passage 20, a first portion in spiked form in which it supplies orifices 21 to 25, in the reverse order of the numbers. The channel 2 firstly comprises a slight narrowing produced by a deflecting part 201, at the end of which it supplies the air insufflation orifice 25. At this level, the air admission channel undergoes a sharp variation in section provoked by the wall 210 which extends to the inlet of the following air insufflation orifice 24. There too, a new wall 211 produces a further sharp reduction in the section of the channel to supply the following air insufflation orifice 23. After said latter, the wall 212 further defines a reduction in section to supply the insufflation orifice 22, and finally the wall 213 defines the last reduction in section, at the end of which the admission channel 2 supplies the last orifice 21 in the lower part of the shaft.

In the embodiment presented, the air admission channel 2 comprises in its upper part a second portion in spiked form, which supplies orifices 26 and 27. From the air inlet passage 20, the walls 220 and 2211 define a first progressive reduction of the section of the channel as far as air insufflation orifice 26. From said latter orifice, a wall 222 defines a sharp reduction in the section of the channel, as far as air insufflation orifice 27. The arrangement of the auxiliary orifice for evacuating part of the refrigerated air 29, which is located in the last part of the air admission channel 2, supplying the upper air insufflation orifice 27, will be noted here.

In the air return channel 3, the arrangement is similar. Taken in reverse from the air outlet passage 30, the return channel 3 comprises a progressive reduction in section by walls 301 and 302 as far as air recovery orifice 33. From said latter orifice, the section of the channel 3 decreases sharply as far as air recovery orifice 32 due to wall 310, then it further decreases due to wall 311 as far as the lower air recovery orifice 31.

Above the air outlet passage 30, the return channel 3 is connected to the air recovery orifice 34, then it undergoes a reduction in section due to wall 321 as far as the following air recovery orifice 35 and so on, its section reducing due to wall 322 as far as the air recovery orifice 36. Finally, the wall 323 further reduces the section of the channel as far as the last air recovery orifice 37. In this latter section of the channel is arranged the auxiliary orifice 39 for admission of fresh air, which has already been mentioned.

The sharp reductions in section of the air admission channel 2 and air return channel 3 according to the invention are determined so as to have the same static insufflation pressure at the different orifices 21 to 27, and the same static air recovery pressure at orifices 31 to 37. To this end, account is obviously taken of the fact that the admission and recovery pressures are different. It is known that the energy of the circulating air comprises a part of kenetic energy due to its velocity and a part of potential energy due to its pressure. Moreover, the circulating air undergoes losses of energy due to the friction on the walls of the pipes. The sharp reductions in the sections of the admission and return channels make it possible, taking into account these losses, and the reduction in the flow at each air insufflation or recovery orifice, to ensure that the air insufflation or recovery pressure will remain the same for the following orifices. Moreover, the angles between the different walls constituting each channel are limited so as to avoid the stream of air from being detached from the wall. Such a conversion, without loss due to detaching of the air stream, of the dynamic pressure (kinetic energy) into static pressure (potential energy) is called "static renewal" in the art.

From each of orifices 21 to 27 and 31 to 37, derivation members are arranged which make it possible to cause the air to rotate through 90° without varying speed. These derivation members are followed by conversion members, which make it possible to pass from the rectangular section of orifices 21 to 27 and 31 to 37 into circular section, intended for connection to the container, via so-called "coupling" devices. In this way, in FIG. 2, the insufflation orifice 21 and the air recovery orifice 31 terminate in circular insufflation section I and recovery section R associated with container No. 1. Similarly, orifices 22 and 32 are associated with container No. 2 and so on up to orifices 27 and 37 which are associated with container No. 7.

The couplings which effect the connection between these circular terminal orifices and the containers themselves are advantageously of the type described in French Patent Application No. 77 10 261 in the name of the present Applicants, filed on Apr. 5, 1977 and entitled, "Coupling member for container-refrigerating installation".

It is also highly advantageous to dispose between the shaft and these couplings, by-passes which present an aeraulic impedance comparable to that of the containers and they are placed in parallel thereon. Such by-passes are described in French Patent Application No. 77 10 260 filed on Apr. 5, 1977 by Applicants and entitled: "Supply of containers with refrigerated air employing by-pass". These by-passes are systematically employed when the stack of containers is incomplete, for example if container No. 7 is missing. In this way, the by-pass ensures between the insufflation and return orifices a circulation of air comparable with that of the container. Consequently, the circulation of air in the admission channel 2 and return channel 3 of the shaft is not disturbed, and these channels 2 and 3 continue to function under the conditions previously described despite the absence of one or more containers. These by-passes may also be employed in place of the containers when it is desired to defrost the cooling battery, which operation will be referred to hereinafter. For foodstuffs, it is also desirable to proceed at the beginning with a rapid refrigeration. In this case, the by-passes are completely closed. They may be partially opened when the cold requirements of the containers become normal after this operation.

The installation for circulating refrigerated air will now be described, firstly generally, then in its different embodiments, with reference to FIGS. 3 and 4.

The cooling battery or refrigerator may be of the type with a circulation of brine (the cold brine is in this case produced by the installations on board the ship) or of the type with direct expansion of a conventional frigorific fluid. It is advantageously provided with electrical resistors intended for defrosting thereof, or provided to receive brine or a cold-evacuating fluid for this same purpose. Beneath the battery there is disposed a defrosting tank allowing the condensates to flow. If necessary, this tank may itself be provided with an electrical resistor or a defrosting circuit using hot brine or hot gas, in order to accelerate the melting of the ice which may fall from the battery.

For its part, the fan is of the centrifugal, single ear type with rearwardly inclined blades and overhanging turbine, advantageously driven with the aid of an electric motor and via a trapezoidal transmission.

It has been observed that, with the shaft of the invention, a centrifugal fan with rearwardly inclined blades enables a yield greater than 80% and a total pressure higher than 200 mm water gauge to be easily attained.

With respect to the axial fans, the centrifugal fan used according to the invention presents other significant advantages:

delivery at right angles with respect to suction, this reducing bulk;

laminary flow of the refrigerated air at delivery without it being necessary to use straightener blades;

stable functioning at the level of the pre-established point of optimum yield;

considerable recovery of energy in the aeraulic circuit due to the considerable difference between the speed of delivery of the fan and its speed of suction.

possibility of placing two fans in parallel without risk of disturbance.

The installation comprising the fan and the cooling battery may be placed behind the shaft of FIGS. 1 and 2 (case of FIGS. 3 and 4) or on the side thereof.

The whole of the refrigeated air distributing installation may supply up to 7 containers whose volume is about 56 m$^3$, ensuring a mixing of air which may range up to about 80 or 90 volumes/hour, with a renewal of air of 0 to 2 volumes/hours.

At air renewal level, it is advantageous to dispose an air-air heat exchanger which cools the fresh air introduced from the vitiated refrigerated air which is evacuated.

In the installation, the maximum speed of insufflation is about 18 m/s and the maximum recovery speed about 10 m/s.

In a first embodiment, illustrated in FIG. 3, the cooling battery 41, disposed horizontally, is connected to two cold brine admission and return pipes 42 and 43. Its lower input is connected via a divergent air deviating device 44 to the air outlet passage 30 of the shaft 10. The battery comprises a finned exchanger, through which circulates the air which is thus refrigerated by the brine, for its part circulating in pipes thermally connected to these fins. The upper outlet of the battery 41 terminates in a chamber 45, and it is in the upper part of this chamber than the fan 46 sucks, and returns the refrigerated air to the inlet passage 20 of the shaft 10.

This embodiment provides the best aeraulic equilibrium of the assembly and, hence, less power is absorbed. However, it has appeared necessary that the distance between the inlet of the fan 46 and the outlet of the cooling battery 41 be larger than twice the large dimension of the upper front finned surface of the battery, which constitutes the outlet thereof. This minimum distance is furnished by the chamber 45.

However, with this embodiment, the relative humidity of the air at the outlet of the fan exceeds 85% with difficulty. This value may be too low for certain food products such as bananas or strawberries.

On the other hand, the second embodiment which will now be described with reference to FIG. 4 allows a relative humidity of up to 95%.

In this embodiment, the fan 56 is disposed upstream of the cooling battery 51. In this embodiment, the electric motor 57 is clearly seen, which drives, via trapezoidal belts, the centrifugal fan 56, although this motor was hidden in the case of FIG. 3.

To conserve a good aeraulic yield in this second embodiment, it has appeared necessary that the fan be provided with a horn 58 at its suction inlet, and useful that the outlet of the fan be connected to the cooling battery via a divergent 59. The horn 58 advantageously presents a half-angle of convergence equal to about 15°. For its part, the divergent 59 advantageously presents a half-angle of divergence of about 6° to 7°. (These values are not strictly respected in FIG. 4 by reason of the schematic representation of the fan-refrigerator unit.

The battery 51, which is of the same type as the battery 41, may, like said latter, be supplied with cold brine or a conventional frigorific fluid (supply pipes not shown).

In the embodiment of FIG. 4, the shaft 10 is turned upside down with respect to the cases of FIGS. 1 to 3. In this way, the outlet passage 30 of the shaft is now higher than its inlet passage 20. On the contrary, the air renewal orifices such as 290 are maintained in the top part (they should therefore be considered as being placed at the bottom of the shaft in FIG. 1).

The cooling battery 51 opens via a convergent air deflecting device 52 into the inlet passage 20 of the shaft 10, and the horn 58 of the fan 56 is connected to the air outlet passage 30 of this same shaft. The air refrigeration installation is thus completed.

Of course, all the elements of the installation are carefully insulated by avoiding thermal bridges, in order to obtain the same coefficient of insulation as that of the containers (K=0.35 kcal/h.m2.° C).

For consumable products, the pipes are all provided with an inner coating suitable for contact with foodstuffs, of the Rilsan, Teflon (Registered Trade Marks) or like type, or by an inner coating of stainless steel.

The installation is advantageously provided with temperature measuring means: resistant thermic probes are disposed at the air recovery of each container, as well as at the beginning of the air inlet passage, which is the outlet of the fan or the outlet of the cooling battery, according to the embodiment.

In the above, a shaft 10 has been described which comprises two portions in spiked form, supplied by a fan and a cooling battery. As has been noted above, two fans may also be placed in parallel.

Other variants of the invention may also be easily imagined. It will be observed that that shaft of FIGS. 1 and 2 may for example be divided into two parts, separated in these Figures by a line of horizontal axis.

The first portion in spiked form, located above the line of horizontal axis, may function alone virtually without loss from the point of view of aeraulic yield on condition that the sections thereof be calculated as a function of the rate of flow. It is then associated with a fan-refrigerator unit which is suitable therefor, thus supplying the four upper containers.

The second spiked portion of the shaft, located below the horizontal line, is then provided with an air admission passage an an air return passage which are suitable therefor, and which connect it to a second fan-refrigerator unit. There again, the sections of the pipes are calculated as a fraction of the rate of flow.

In this latter embodiment, Applicants have observed that it is advantageous to place the two fan-refrigerator units on the side of the shaft, rather than behind it.

What is claimed is:

1. In an installation for distributing refrigerated air in stacked containers, particularly containers for food products, of the type comprising a vertical structure or shaft provided with a series of pairs of orifices, each pair of which possesses an orifice for the insufflation of refrigerated air into a container and an orifice for recovering the air from the same container, which shaft further comprises an air admission channel connected to the air insufflation orifices, an air return channel connected to the air recovery orifices, an air inlet passage in the admission channel, and an air outlet passage from the return channel, and which installation further comprises an air cooling battery and a fan forming a device for circulating refrigerated air between said air inlet and outlet passages in the shaft; the improvement wherein:

the admission channel presents, starting from the air inlet passage, a portion in spiked form whereby said channel successively supplies different air insufflation orifices, presenting a sharp reduction in section at each of these orifices, and, from the air outlet passage, the air return channel similarly presents a spiked portion whereby said channel is successively connected to different air recovery orifices, presenting a sharp reduction in section at the level of each of these orifices, said reductions in section being determined in order to have the same static pressure of insufflation at each level of the different insufflation orifices and the same static recovery pressure at each level of the different air recovery orifices.

2. The installation of claim 1, wherein the admission channel and the return channel each present two portions in spiked form, on both sides of the air inlet passage and the air outlet passage, respectively.

3. The installation of claim 1, wherein the air admission channel presents an auxiliary orifice for evacuating part of the refrigerated air, and the air return channel presents an auxiliary orifice for the admission of fresh air, these two orifices being located in the zones of said channels which supply their last container orifice, and allowing a renewal of the refrigerated air.

4. The installation of claim 1, wherein the fan is a centrifugal fan with rearwardly inclined blades, this giving a high total pressure improving the operational conditions of the air admission channel and of the air return channel, and avoids the condensation on the blades of the humidity in the air.

5. The installation of claim 4, wherein the fan is disposed between the air cooling battery and the air inlet passage and a space is arranged between the suction inlet of the fan and the outlet of the cooling battery.

6. Ths installation of claim 4, wherein the fan is disposed between the air outlet passage and the cooling battery, a horn of convergent demi-angle close to 15° is mounted between the air outlet passage and the suction inlet of the fan, and a divergent of demi-angle of about 6 to 7° is mounted between the outlet of the fan and the cooling battery.

7. The installation of claim 1, wherein it comprises a by-pass between the air insufflation and air recovery orifices of each pair.

* * * * *

UNITED STATES PATENT AND TRADEMARK OFFICE
CERTIFICATE OF CORRECTION

PATENT NO. : 4,182,135
DATED : January 8, 1980
INVENTOR(S) : Daniel Georges Calle It is certified that error appears in the above-identified patent and that said Letters Patent are hereby corrected as shown below:

```
Column 4, line 29, delete "2211" and insert --221--
   therefor;
Column 4, line 64, delete "kenetic" and insert --kinetic--
   therefor;
Column 6, line 54, delete "than" and insert --that--
   therefor;
Column 7, line 18, delete "unit." and insert --unit.)--
   therefor;
Column 7, line 66, first occurrence delete "an" and insert
   --and-- therefor;

Column 8, line 57, delete "Ths" and insert --The--
   therefor.
```

Signed and Sealed this

Twentieth Day of May 1980

[SEAL]

Attest:

SIDNEY A. DIAMOND

Attesting Officer     Commissioner of Patents and Trademark